TELEVISION SET REPAIR STAND

Filed Dec. 2, 1955 2 Sheets-Sheet 1

INVENTORS
MARVIN G. LAMB
& JACK H. WALL
BY McMorrow, Berman + Davidson
ATTORNEYS May 28, 1957 M. G. LAMB ET AL 2,793,426

TELEVISION SET REPAIR STAND

Filed Dec. 2, 1955 2 Sheets-Sheet 2

INVENTORS
MARVIN G. LAMB
& JACK H. WALL
BY

McMorrow, Berman + Davidson
ATTORNEYS

United States Patent Office 2,793,426

Patented May 28, 1957

2,793,426

TELEVISION SET REPAIR STAND

Marvin G. Lamb and Jack H. Wall, Fort Collins, Colo.

Application December 2, 1955, Serial No. 550,638

4 Claims. (Cl. 29—288)

This invention relates to a stand intended to facilitate the performance of repair operations on television sets.

When a television set is being repaired in the shop, as a first step it is necessary to remove the chassis from the cabinet. This involves, first, the removal of screws or equivalent fastening elements holding the back plate in position, after which a number of other screws must be removed from the bottom of the cabinet, the latter screws holding the chassis to the cabinet. Then, the chassis, after removal of the speaker, must be slid out of the now open back of the cabinet.

The performance of this operation, when the television set is supported on a work counter or the like, is accompanied by some difficulty, in view of the fact that to remove the screws from the underside of the cabinet, the cabinet must be tilted forwardly. This may in some instances result, and often has resulted, in marring of the front of the cabinet, and in addition, the handling of the heavy set to tilt the same to the various positions required involves an undesirable expenditure of effort in the part of the worker, the use of excessive care, and the loss of valuable time.

Further, after the chassis has been removed, it is often necessary that the chassis itself be tilted to permit repairs to be made at the underside thereof. It may be noted, in this regard, that this is required in a great number of instances, particularly when shop repairs are being made, in view of the fact that a major portion of the wiring, and of the other electrical components making up the set, is disposed at the underside of the chassis.

Finally, following repair of the set, the operations of inserting the chassis in the cabinet, and then tilting the cabinet once again for the purpose of replacing the screws, must be carried out.

The main object of the present invention, in view of the above, is to provide a television repair stand which will be particularly designed to facilitate first, the removal of the chassis from the cabinet, second, the performance of all necessary repairs on the chassis both at the top and at the underside thereof, and finally, the replacement of the chassis in the cabinet.

Another object of importance is to provide a television repair stand of the type referred to wherein the danger of marring the cabinet is eliminated, while at the same time permitting swift adjustment of the cabinet to horizontal and tilted positions respectively.

Another object of importance is to provide a television set repair stand which will permit the swift adjustment both of the cabinet and of the chassis to any position necessary to form the requisite operations thereon.

Still another object is to provide a television repair stand of the type referred to which, both before and following the repairing of the television set, will permit rolling of the set to any of various locations within the shop.

A further object of importance is to provide a television set repair stand so designed as to particularly facilitate the sliding of the chassis or cabinet between said stand and an adjacent work table or counter.

Other objects will appear from the following description, the claims appended thereto, and from the annexed drawing, in which like reference characters designate like parts throughout the several views, and wherein:

Figures 1, 2:
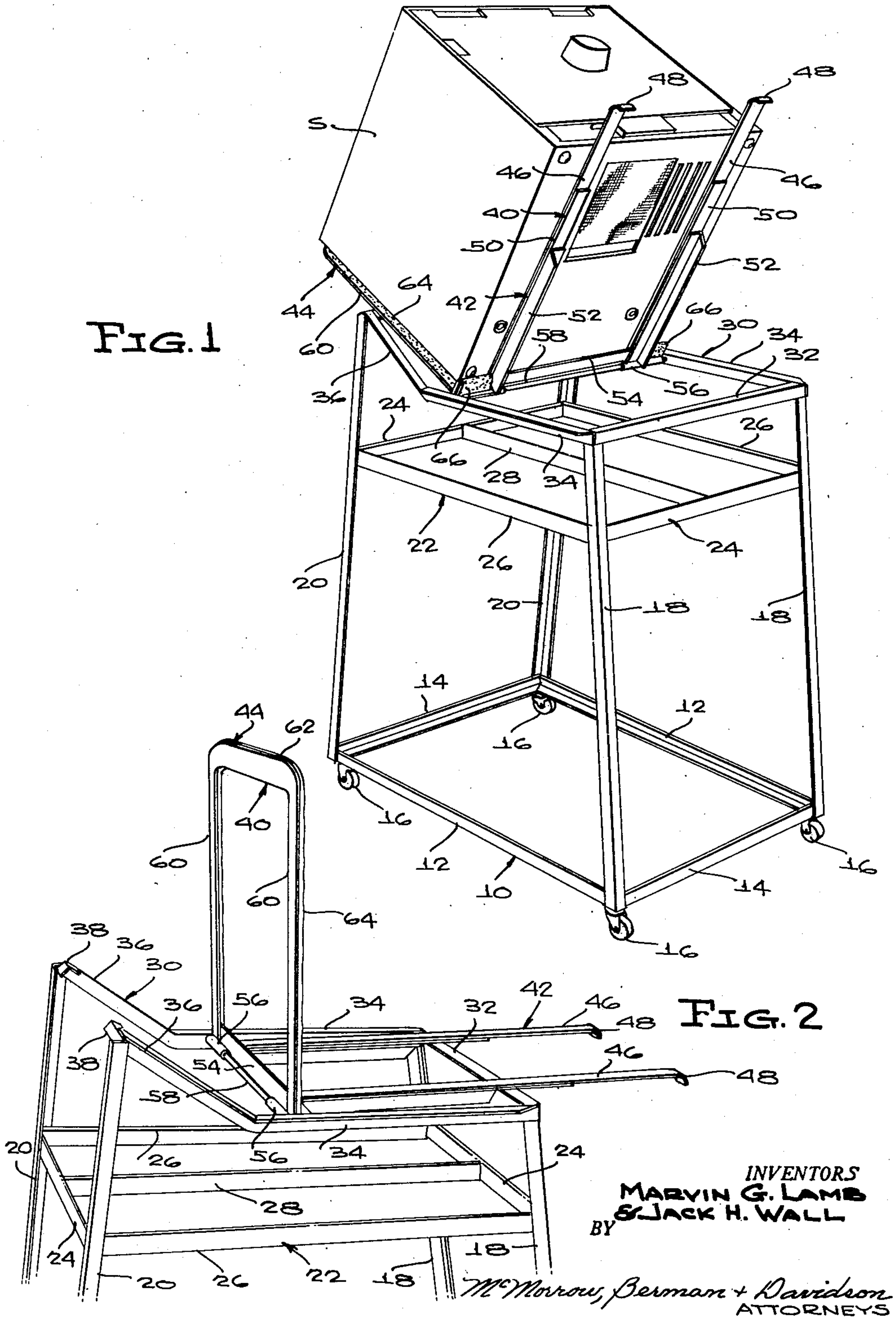
Figure 1 is a rear perspective view of a television set repair stand formed in accordance with the present invention, showing a conventional television set supported thereon with the set tilted.
Figure 2 is a perspective view of the upper portion of the stand with the set support table in its normal, untilted position.

Referring to the drawings in detail, the stand constituting the present invention includes a rectangular, open bottom frame 10 disposed in a horizontal plane and including straight, parallel side rails 12 welded at their opposite ends or otherwise fixedly secured to end rails 14. At the corners of the bottom frame, there are provided casters 16 facilitating the movement of the stand to any of various, desired locations.

Fixedly secured at their lower ends to and projecting upwardly from the corners of the bottom frame 10 are rear support legs 18 and front support legs 20. The legs 20 are substantially longer than the legs 18 as shown to particular advantage in Figures 1, 2, and 4. The several legs converge slightly in a direction upwardly from the bottom frame in the preferred, illustrated embodiment, but some or all of the legs could be vertically disposed, if desired.

A tray, for supporting parts removed from the set S being repaired, is secured to the several legs intermediate the opposite ends of said legs, and has been generally designated at 22. The tray comprises a flat, rectangular plate, having upwardly turned end flanges 24 and upwardly turned side flanges 26. A middle flange 28 extends between the end flanges 24, and serves not only to brace the tray, but also to partition the tray into side by side compartments.

A top frame has been generally designated at 30, and includes a horizontally disposed rear cross member 32 fixedly connected between the upper ends of the legs 20. Projecting forwardly from the ends of the rear cross member 32 are horizontal side members 34 terminating at their front ends well inwardly from the front legs 20 and merging at their front ends into inclined side members 36. Members 36 are inclined upwardly in a direction away from the horizontal side members 34 of the top frame, terminating at the upper extremities of the legs 20. At their upper, forward ends, the inclined side members 36 are rigid with inwardly projecting, short abutments 38, extending toward one another as shown in Figure 3 and aligned transversely of the top frame in the space between the sides of the top frame.

Figures 3, 4:
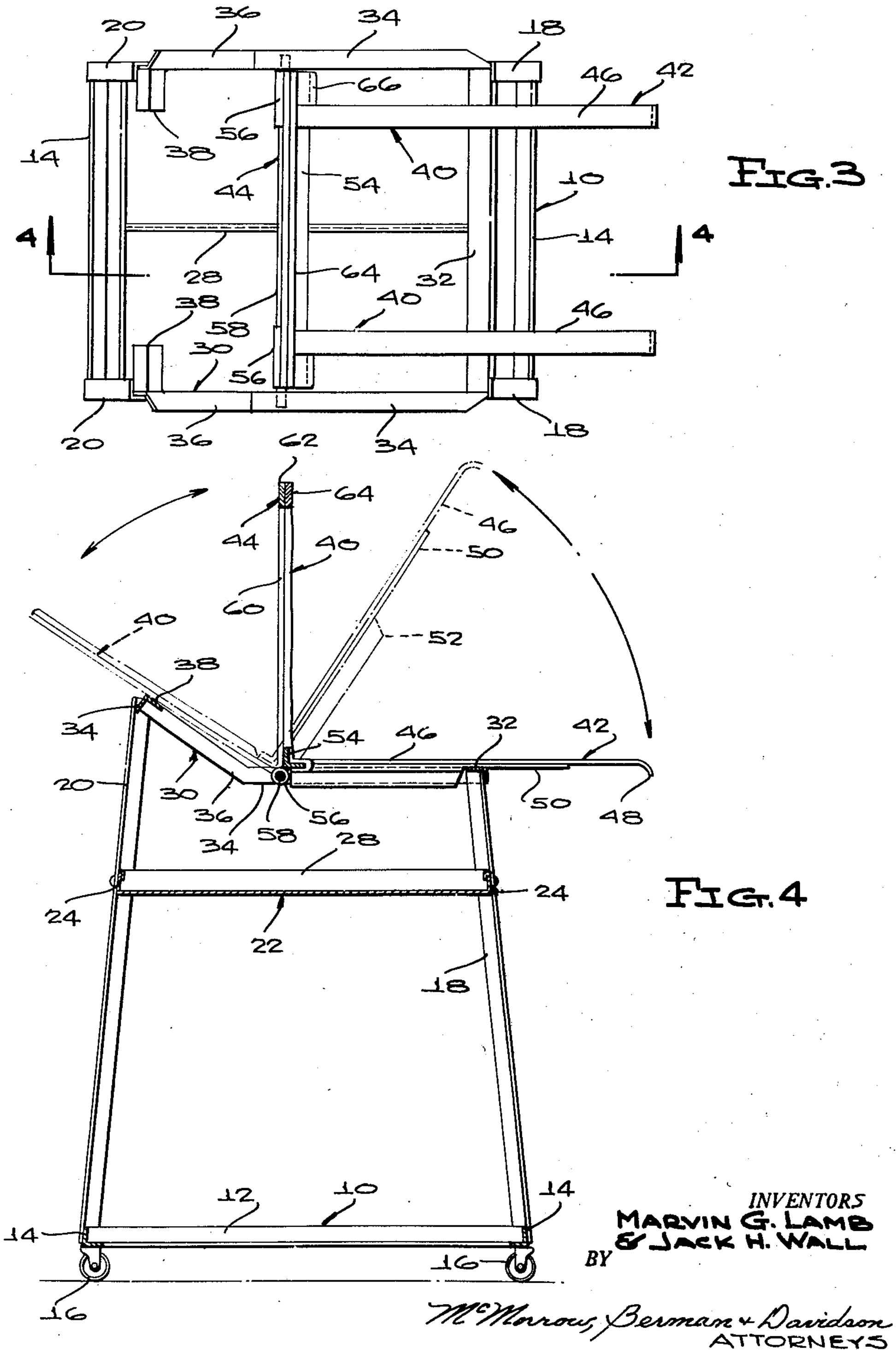
Figure 3 is a top plan view of the stand with the table in the position shown in Figure 2.
Figure 4 is a vertical sectional view substantially on line 4—4 of Figure 3, the dotted lines showing the table in its tilted position and the full lines showing said table in its normal position.

A work support table generally designated at 40 is swingably mounted upon the top frame for swinging movement between the full and dotted line positions shown in Figure 4, about a horizontal axis extending transversely of the top frame in the plane of the side members 34 thereof, adjacent the juncture of the side members 34 with the inclined members 36.

The work support table includes bottom and front table portions 42, 44 respectively, fixedly connected to one another and disposed in perpendicularly related planes, the pivot axis of the table being disposed substantially at the juncture of the planes of said portions 42, 44.

The bottom table portion 42 includes a pair of elongated straight, parallel arms 46 spaced apart transversely of the stand as shown in Figure 3, and disposed adjacent to and inwardly from the respective sides of the top frame. As a result, when the work table is swung to its full line position in Figure 4, the rear cross member 32 of the top frame constitutes an abutment engaging the bottom table portion 42 with said bottom table portion under these circumstances being disposed in a horizontal plane.

The arms 46 project rearwardly from the top frame a substantial distance as shown in Figure 4, and at their rearward, free ends are formed with downwardly curved, hook-like extensions 48. The extensions 48 are adapted to hook over an end bar of an adjacent work counter or work table, not shown, whenever the chassis or cabinet is to be slid between said counter and the repair stand constituting the present invention.

To reinforce the arms 46, there are provided reinforcing bars 50 secured fixedly to the undersides of the arms and extending to a location in closely spaced relation to the free ends of said arms. Further, there are provided auxiliary reinforcing members 52 secured fixedly to the undersides of the members 50 and terminating inwardly from the outer ends of said members 50 as shown in Figure 4, so as to be confined wholly in the space circumscribed by the side and rear members of the top frame, when the swinging work support table 40 is in its full line position of Figure 4.

Fixedly connected between the front ends of the arms 46 is a front cross bar 54 of the work support table, and welded or otherwise fixedly secured to the respective end portions of said front cross bar 54, below the same, are bearing sleeves 56 aligned with one another transversely of the stand. A pivot shaft or rod 58 extends through the sleeves 56 and at its opposite ends is journalled in bearing openings formed in the front end portions of the horizontal side members 34 of the top frame.

The front table portion 44 includes a pair of side legs 60, integral at their upper ends with a bight portion 62 (see Figure 2). The front table portion is thus of a U-shape, with the ends of the leg 60 remote from bight 62 being fixedly secured to the ends of the cross bar 54.

Pedding 64 covers the front table portion, overlying all areas that will be contacted by the front of the set S being repaired. The padding, at the inner ends of the side legs 60 of the front table portion, is extended over the end portions of the cross bar as at 66 (Figures 1 and 4).

By reason of the construction illustrated and described, the various disassembly, repair, and reassembly operations previously described herein can be carried out with speed and ease. Thus, in use, the set S that is to be repaired is placed upon the table 40 with the table in its normal, untilted position shown in Figure 2. Then, all the control knobs are removed, after which the screws holding the back of the set are removed and are placed in the tray 22. Then, the table 40 is tilted from the full to the dotted line positions of Figure 4.

This exposes the underside of the television set, and as a next step, all bolts and screws holding the chassis to the cabinet at the bottom of the set are removed, and are placed in tray 22. It will be seen that when the table 40 is tilted for this purpose, the front of the television set (see Figure 1) will be protected against being marred or otherwise damaged by the padding, and it will further be apparent that the tilting is accomplished with a minimum amount of effort on the part of the worker. Due to the inclination of the top frame at the front portion thereof, and the disposition of the abutments or ears 38 in a higher plane than the pivot axis of the table 40, the television set will be maintained in a tilted or inclined position, in which position it is inclined substantially from the horizontal.

Following removal of the bolts and screws from the underside of the cabinet, the table 40 is swung back to its normal position, and after removal of the speaker and placement of the speaker in tray 22, the cassis is slid out of the cabinet onto an adjacent work counter to which the arms 46 are hooked at their free ends.

The cabinet is now removed from the repair stand and the chassis slid black onto the table, after which any necessary repairs can be made upon the chassis. Repairs made on the top of the chassis can be made with the table in its Figure 2 position, and repairs to be made on the underside thereof can be made with the table in its Figure 1 position.

After all necessary repairs have been made, the chassis is slid back onto an adjacent counter, the cabinet placed back on the table, and the chassis slid back into the cabinet. Then, the table is tilted for the purpose of replacing the bolts and screws holding the chassis to the cabinet, and subsequently, with the table returned to its normal position, replacement of the knobs, speaker, and the back of the cabinet can be made for the purpose of performing any necessary final adjustments and preparing the set for return to the owner. With the repaired set supported upon the stand, the stand can be rolled to any part of the repair room, to a loading dock, etc.

It will be seen that the stand facilitates the removal and replacement of the chassis in the cabinet, and further facilitates the making of any necessary repairs on the chassis itself. Further, the construction is such as to insure that no damage will be done to the cabinet, despite the fact that swift adjustment of the cabinet between horizontal and tilted positions can be made. Lifting of heavy sets, and other heretofore required exertions are eliminated or at least reduced to a minimum.

Although the construction illustrated embodies the use of angle members, flat bars, etc., it will be understood that in a commercial embodiment the entire device, or at least a substantial portion thereof, can be formed of metal tubing or the like.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A television set repair stand comprising: a support frame assembly including a top frame having one end portion in a horizontal plane and its opposite end portion in a plane obtusely related to the first plane; and a work support table including generally planiform table portions fixedly connected substantially at right angles to each other, said table being pivotally connected to the top frame for swinging movement about a horizontal axis extending substantially in the plane of the first named end portion of the top frame, said end portions of the top frame extending in the path of swinging movement of the table in opposite directions, whereby to effect swinging movement of the table between a first position in which the first named end portion of the top frame will support one table portion approximately in a horizontal plane with the other table portion extending in a generally vertical plane, and an opposite extreme position in which the second named table portion will be engaged by the second named top frame portion for disposition of both portions of the table in inclined planes.

2. A television set repair stand comprising: a top frame including a pair of horizontal side members, a cross member fixedly connected between one end of the side members, the side members at their other ends merging into inclined side members, said inclined side members being inclined upwardly in a direction away from the cross member and being rigid, at their upper ends, with inwardly projecting, short abutments extending toward one another and aligned transversely of the top frame; and a work support table swingably mounted upon the top frame, said work support table including bottom and front table portions fixedly connected to one another and lying in perpendicularly related planes, the work support table being pivotally connected to the first named side members for swinging movement about an axis parallel to the cross member, said axis being disposed substantially at the juncture of said planes, the work support table including a first table portion formed with a pair of elongated, straight, parallel arms disposed adjacent to and inwardly from the respective first named side members of the top frame, said arms projecting from the pivot axis of the work support table beyond the cross member, so as to rest upon the cross member in one position to which the work support table is swung, said first named table portion being disposed in a horizontal plane in said one position, the work support table further including a second table portion formed with a pair of side legs extending from said pivot axis in parallel relation, said second named table portion further including a bight portion connected between the ends of the side legs remote from the pivot axis, said side legs being spaced apart a distance corresponding to the spacing of the abutments of the top frame, so as to rest upon the top frame abutments in a second position to which the work support table is swingably adjusted about its pivot axis.

3. A television set repair stand comprising: a top frame including a pair of horizontal side members, a cross member fixedly connected between one end of the side members, the side members at their other ends merging into inclined side members, said inclined side members being inclined upwardly in a direction away from the cross member and being rigid, at their upper ends, with inwardly projecting, short abutments extending toward one another and aligned transversely of the top frame; and a work support table swingably mounted upon the top frame, said work support table including bottom and front table portions fixedly connected to one another and lying in perpendicularly related planes, the work support table being pivotally connected to the first named side members for swinging movement about an axis parallel to the cross member, said axis being disposed substantially at the juncture of said planes, the work support table including a first table portion formed with a pair of elongated, straight, parallel arms disposed adjacent to and inwardly from the respective first named side members of the top frame, said arms projecting from the pivot axis of the work support table beyond the cross member, so as to rest upon the cross member in one position to which the work support table is swung, said first named table portion being disposed in a horizontal plane in said one position, the work support table further including a second table portion formed with a pair of side legs extending from said pivot axis in parallel relation, said second named table portion further including a bight portion connected between the ends of the side legs remote from the pivot axis, said side legs being spaced apart a distance corresponding to the spacing of the abutments of the top frame, so as to rest upon the top frame abutments in a second position to which the work support table is swingably adjusted about its pivot axis, the abutments being disposed at a level substantially above the plane of the first named side members and cross member of the top frame, said level being selected to dispose the first and second named table portions in inclined planes in the second position of the work support table.

4. A television set repair stand comprising: a top frame including a pair of horizontal side members, a cross member fixedly connected between one end of the side members, the side members at their other ends merging into inclined side members, said inclined side members being inclined upwardly in a direction away from the cross member and being rigid, at their upper ends, with inwardly projecting, short abutments extending toward one another and aligned transversely of the top frame; and a work support table swingably mounted upon the top frame, said work support table including first and second table portions fixedly connected to one another and lying in perpendicularly related planes, the work support table being pivotally connected to the first named side members for swinging movement about an axis parallel to the cross member, said axis being disposed substantially at the juncture of said planes, the first table portion being formed with a pair of elongated, straight, parallel arms disposed adjacent to and inwardly from the respective first named side members of the top frame, said arms projecting from the pivot axis of the work support table beyond the cross member, so as to rest upon the cross member in one position to which the work support table is swung, said first named table portion being disposed in a horizontal plane in said one position, the second table portion being formed with a pair of side legs extending from said pivot axis in parallel relation, said second named table portion further including a bight portion connected between the ends of the side legs remote from the pivot axis, said side legs being spaced apart a distance corresponding to the spacing of the abutments of the top frame, so as to rest upon the top frame abutments in a second position to which the work support table is swingably adjusted about its pivot axis, the projecting portions of the arms being formed with depending, hook-like extensions adapted for engagement with an adjacent support, for sliding of a workpiece upon the arms off the work support table onto said adjacent support.

References Cited in the file of this patent

UNITED STATES PATENTS 1,313,340 Sell ------------------- Aug. 19, 1919

FOREIGN PATENTS 321,749 Great Britain ----------- Nov. 21, 1929